United States Patent
Claret et al.

(10) Patent No.: US 12,476,051 B2
(45) Date of Patent: Nov. 18, 2025

(54) HIGH-DENSITY CAPACITIVE DEVICE AND METHOD FOR MANUFACTURING SUCH A DEVICE

(71) Applicant: COMMISSARIAT À L'ÉNERGIE ATOMIQUE ET AUX ÉNERGIES ALTERNATIVES, Paris (FR)

(72) Inventors: Thierry Claret, Grenoble (FR); Delphine Ferreira, Grenoble (FR); Aude Lefevre, Grenoble (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 823 days.

(21) Appl. No.: 17/655,080

(22) Filed: Mar. 16, 2022

(65) Prior Publication Data

US 2022/0301784 A1    Sep. 22, 2022

(30) Foreign Application Priority Data

Mar. 18, 2021 (FR) ..................... 2102733

(51) Int. Cl.
*H01G 4/30* (2006.01)
*H01G 4/008* (2006.01)
(Continued)

(52) U.S. Cl.
CPC .............. *H01G 4/306* (2013.01); *H01G 4/012* (2013.01); *H01G 4/33* (2013.01); *H10D 1/042* (2025.01);
(Continued)

(58) Field of Classification Search
CPC .......... H01G 4/306; H01G 4/012; H01G 4/33; H01G 4/008; H01G 4/085; H01G 4/10;
(Continued)

(56) References Cited

U.S. PATENT DOCUMENTS

2013/0083454 A1*  4/2013  Masuda ................... H01G 4/06
                                                                  29/25.03
2015/0200058 A1   7/2015  Rubloff et al.
(Continued)

FOREIGN PATENT DOCUMENTS

EP    3680931 A1    7/2020
EP    3723148 A1    10/2020
(Continued)

OTHER PUBLICATIONS

Search Report for French application No. FR 2102733 dated Dec. 6, 2021.
(Continued)

*Primary Examiner* — Duy T Nguyen
*Assistant Examiner* — Kenneth Mark Sipling
(74) *Attorney, Agent, or Firm* — Chrisman Gallo Tochtrop LLC

(57) ABSTRACT

A method for manufacturing a capacitive device comprising the following steps: a) providing a metallic layer, b) depositing a full-sheet aluminium layer, c) structuring pores in the aluminium layer by a full-sheet anodic etching process, subsequently to which a continuous porous alumina layer is obtained comprising a first main face and a second main face, longitudinal pores extending from the first main face to the second main face, d) forming a capacitive area at a first area of the porous alumina layer, e) forming an upper electrode over the capacitive area, f) forming a contact resumption at a second area of the porous alumina layer, g) forming a lower electrode over the contact resumption.

14 Claims, 4 Drawing Sheets

(51) Int. Cl.
  *H01G 4/012* (2006.01)
  *H01G 4/08* (2006.01)
  *H01G 4/10* (2006.01)
  *H01G 4/252* (2006.01)
  *H01G 4/33* (2006.01)
  *H10D 1/00* (2025.01)
  *H10D 1/68* (2025.01)

(52) U.S. Cl.
  CPC ............ *H10D 1/043* (2025.01); *H10D 1/714* (2025.01); *H10D 1/716* (2025.01); *H01G 4/008* (2013.01); *H01G 4/085* (2013.01); *H01G 4/10* (2013.01); *H01G 4/252* (2013.01)

(58) Field of Classification Search
  CPC .......... H01G 4/252; H01G 4/06; H01G 4/228; H10D 1/042; H10D 1/043; H10D 1/714; H10D 1/716
  See application file for complete search history.

(56) References Cited

U.S. PATENT DOCUMENTS

| | | | | |
|---|---|---|---|---|
| 2016/0032475 | A1* | 2/2016 | Huyghebaert | H01M 4/661 174/128.1 |
| 2018/0233300 | A1* | 8/2018 | Horikawa | H01G 11/12 |
| 2020/0258690 | A1* | 8/2020 | Tsunoda | H01G 4/1209 |
| 2020/0402724 | A1* | 12/2020 | Nobuta | H01G 9/055 |

FOREIGN PATENT DOCUMENTS

| | | |
|---|---|---|
| KR | 20080018702 A | 2/2008 |
| WO | 2020162459 A1 | 8/2020 |

OTHER PUBLICATIONS

Losic, Dusan et al. "Porous Alumina with Shaped Pore Geometries and Complex Pore Architectures Fabricated by Cuclic Anodization" Small 2009, vol. 5, No. 12, pp. 1392-1397.

Hourdakis, E. et al. "High-Density MIM Capacitors With Porous Anodic Alumina Dielectric" IEEE Transactions on Electron Devices, Oct. 2010, vol. 57, No. 10, pp. 2679-2683.

Banerjee, Parag et al. : Nanotubular metal-insulator-metal capacitor arrays for energy storage Nature Nanotechnology, May 2009, vol. 9, pp. 292-296.

* cited by examiner

HIGH-DENSITY CAPACITIVE DEVICE AND METHOD FOR MANUFACTURING SUCH A DEVICE

CROSS-REFERENCE TO RELATED APPLICATIONS

This application claims priority from French Patent Application No. 2102733 filed on Mar. 18, 2021. The content of this application is incorporated herein by reference in its entirety.

TECHNICAL FIELD

The present invention relates to the general field of capacitive devices.

The invention relates to a method for manufacturing a high-density capacitive device.

The invention also relates to a capacitive device obtained in this manner.

The invention is particularly interesting since it allows obtaining a high-density capacitive device (more than 1 $\mu F/mm^2$) having a good compactness.

The invention finds applications in many industrial fields, and in particular for the manufacture of passive components and for 3D integration.

PRIOR ART

High-density capacitances are nowadays the subject of intense development. In particular, these capacitances comprise a stack, called a capacitive stack, provided with two or three layers, and formed over a surface or a structure having a high shape factor in order to limit the bulk of these capacitances.

In this respect, nanowires or nanotubes, and more particularly carbon nanotubes (NTC), which have a considerable surface/volume ratio, are prime candidates for making these structures with a high shape factor. To form such capacitances, a Metal/Insulator/Metal stack (or an Insulator/Metal stack) is deposited over the deployed surface of the CNT pillars or of the nanowires. Then, capacitive areas with MIM (or IM) and contact resumption areas on the lower electrode are defined. This technology based on CNT or nanowires enables contact resumption for RF components (>GHz). However, the maturity of this technology has yet to be demonstrated.

Amongst the most sophisticated capacitive devices, mention may be made of those obtained with a Metal/Insulator/Metal (MIM) deposition over the deployed surface of a porous alumina matrix. High-density capacitances (in the range of 1 $\mu F/mm^2$) with breakdown voltages of a few volts may be obtained. These devices have begun appearing in the market.

The porous alumina is obtained by anodisation of an aluminium layer through a hard mask comprising openings at the capacitive area and at the contact resumption area.

Yet, during the anodisation of the aluminium, the hard mask undergoes considerable deformations because of the packing of the anodised material (typically, the packing coefficient is comprised between 1.2 and 1.6). This deformation generates a topology of a few microns but above all cracks in the hard mask. In order to fill in the cracks, a "sealing" layer is generally formed above the mask.

However, such a method generates a non-usable peripheral area comprising (FIG. 1):

a first portion 1 with pores that are accessible but disposed in a non-vertical manner, a second portion 2 with non-homogeneous pores disposed beneath the hard mask and/or beneath the protective layer ensuring sealing of the hard mask.

Thus, not only does the implementation of a hard mask complicate the method, but it also deteriorates a portion of the available surface into a non-usable area.

DISCLOSURE OF THE INVENTION

The present invention aims to provide a method overcoming the drawbacks of the prior art and allowing obtaining a high-density capacitive device, the method having to be simple to implement.

For this purpose, the present invention provides a method for manufacturing a capacitive device comprising the following steps:
   providing a metallic layer,
   b) depositing a full-sheet aluminium layer,
   c) structuring pores in the aluminium layer by a full-sheet anodic etching process, subsequently to which a continuous porous alumina layer is obtained comprising a first main face and a second main face, longitudinal pores extending from the first main face to the second main face of the alumina layer, the pores being perpendicular or substantially perpendicular to the first main face and to the second main face,
   d) forming a capacitive area at a first area of the porous alumina layer,
   e) forming an upper electrode over the capacitive area,
   f) forming a contact resumption at a second area of the porous alumina layer,
   g) forming a lower electrode over the contact resumption.

The invention differs from the prior art primarily by the formation of a full-sheet (or full-plate) porous alumina insulating matrix. By depositing a full-sheet aluminium layer, we mean that the aluminium layer is deposited on the entire surface of the substrate/underlying layer. The anodisation is a full-sheet (or full plate) anodisation. Such a method does not require any mask.

The method for manufacturing the capacitive device is also simplified in comparison with those of the prior art and allows preserving the integrity of the pores of the alumina matrix.

According to a first variant, step d) and/or step f) may be carried out by depositing a capacitive stack in the pores of the porous alumina layer.

According to this first variant, step d) may comprise the following substeps:
   d1) over the porous alumina layer, forming a mask having an opening making the first area of the porous alumina layer accessible,
   d2) depositing a first continuous capacitive stack over the first area of the porous alumina layer, the first capacitive stack consistently covering the porous alumina layer and consistently overlaying the pores of the porous alumina layer, at the first area,
   the first capacitive stack comprising an upper conductive layer, an insulating layer and a lower conductive layer.

According to this first variant, step f) may comprise the following substeps:
   f1) over the porous alumina layer, forming a mask having an opening making the second area of the porous alumina layer accessible,
   f2) depositing a second continuous capacitive stack over the second area of the porous alumina layer, the second capacitive stack consistently covering the porous alumina layer and consistently overlaying the pores of the porous alumina layer, at the second area, f3) etching the second capacitive stack at the second area of the porous alumina layer so as to make the second face of the porous alumina layer at the second area accessible, the second capacitive stack comprising an upper conductive layer, an insulating layer and a lower conductive layer.

Advantageously, steps d1) and f1) are carried out simultaneously and/or steps d2) and f2) are carried out simultaneously.

Advantageously, the first capacitive stack and the second capacitive stack are identical and deposited simultaneously by ALD.

According to another variant, step d) and/or step f) may be carried out by forming metallic nanowires in the pores of the porous alumina layer at the first area and/or at the second area, by removing the porous alumina layer and then by depositing a capacitive stack over the metallic nanowires.

According to this second variant, step d) may comprise the following substeps:

d1') over the porous alumina layer, forming a mask having an opening making the first area of the porous alumina layer accessible, d2') forming metallic nanowires or carbon nanotubes by electrochemistry in the pores of the porous alumina layer at the first area, d3') removing the porous alumina layer at the first area, d4') depositing a continuous capacitive stack over the metallic nanowires or over the carbon nanotubes, at the first area, the capacitive stack consistently covering the metallic nanowires or the carbon nanotubes, the capacitive stack comprising an upper conductive layer, an insulating layer and possibly a lower conductive layer.

According to this second variant, step f) may comprise the following substeps:

f1') over the porous alumina layer, forming a mask having an opening making the second area of the porous alumina layer accessible, f2') forming metallic nanowires or carbon nanotubes by electrochemistry in the pores of the porous alumina layer at the second area, f3') removing the porous alumina layer at the second area, f4') depositing a continuous capacitive stack over the metallic nanowires or over the carbon nanotubes, at the second area, the capacitive stack consistently covering the metallic nanowires or the carbon nanotubes, the capacitive stack comprising an upper conductive layer, an insulating layer and possibly a lower conductive layer.

It is possible to make:

the capacitive area and the contact resumption according to the first variant, the capacitive area and the contact resumption according to the second variant, the capacitive area according to the first variant and the contact resumption according to the second variant, the capacitive area according to the second variant and the contact resumption according to the first variant.

Alternatively, the contact resumption (step f) may be formed according to the following substeps:

over the porous alumina layer, forming a mask having an opening making the second area of the porous alumina layer accessible, totally or partially filling the pores of the porous alumina layer at the second area, with an electrically-conductive element (such as copper, tungsten or nickel), preferably by electrochemical deposition or by atomic layer deposition, so as to form a contact resumption.

Advantageously, the metallic layer rests on a support substrate covered by a dielectric layer and the method includes a step during which a trench is formed, for example by wet etching, in the porous alumina layer, the trench extending up to the dielectric layer covering the support substrate.

Advantageously, a barrier layer, preferably made of tungsten, is disposed between the metallic layer and the aluminium layer.

Depending on the specifications of the capacitances, the porous alumina layer may have a thickness from a few micrometres to a few tens of micrometres. Advantageously, the porous alumina layer has a thickness ranging from 10 to 15 µm.

The method has many advantages:

the porous alumina layer is obtained on a solid plate, without using any mask, which simplifies the manufacturing method, and reduces the manufacturing costs, the full-sheet anodisation avoids the deterioration of the pores as is the case with the processes of the prior art, the topology is controlled, an optimisation of the setup, enable an ideal contact resumption for RF devices, a simplification of the stack, an ease of the process of isolating the lower electrode despite the high topology and/or an ease of the process of generating cutting paths despite the high topology by local etching of the alumina layer which is done starting from the pores, laterally, in about ten minutes; the duration of this etching is independent of the height of the pores.

The invention also relates to a high-density capacitive device obtained according to the previously-described method comprising:

a metallic layer, preferably aluminium-based, for example made of AlCu, a continuous porous alumina layer comprising a first main face and a second main face, the porous alumina layer comprising through pores extending from the first main face to the second main face, the pores being perpendicular or substantially perpendicular to the first main face and to the second main face, a first continuous capacitive stack consistently covering the second face of the porous alumina layer and consistently overlaying the pores of the porous alumina layer at a first area of the porous alumina layer, so as to form a capacitive area, the first capacitive stack comprising an upper conductive layer, for example made of TiN, an insulating layer for example made of $Al_2O_3$, and possibly a lower conductive layer for example made of TiN, an upper electrode covering the capacitive area, an electrically-conductive element partially or totally filling the pores of the porous alumina layer at a second area, and leaving the second main face of the porous alumina layer at the second area accessible, so as to form a contact resumption, the electrically-conductive element being preferably a second continuous capacitive stack consistently overlaying the pores of the porous alumina layer at the second area of the porous alumina layer, the second stack, being advantageously identical to the first capacitive stack, a lower electrode covering the contact resumption.

Thus, the obtained capacitive structure includes:
- a metallic layer, electrically connected to the lower electrode,
- a porous alumina matrix, having a high shape factor, disposed over the metallic layer,
- a capacitive area, formed by a first area (or portion) of the porous alumina matrix and by a capacitive stack, preferably a metal, insulator, metal (MIM) three-layer, overlaying the pores of the porous matrix,
- a BF and/or RF contact resumption area disposed at a second area (or portion) of the porous alumina matrix, and formed thanks to a conductive material deposition, the deposition may possibly completely fill the porous matrix.

The invention differs from the prior art primarily by the presence of a full-sheet formed porous alumina layer.

The capacitive device has, on the one hand, a more controlled topology, and especially an optimised setup and, on the other hand, a contact resumption of the lower electrode allowing considering RF components operating beyond the GHz range.

The configuration and/or the arrangement of such a capacitive device allows conferring a better compactness on the latter in comparison with the known devices of the prior art.

The deposition of a MIM (metal/insulator/metal) or IM (insulator/metal) stack partially, and preferably totally, filling the pores of the alumina allows optimising RF contacts that are more efficient than a solid material with an equivalent section, the RF currents being just "skin currents".

Advantageously, the device comprises an insulation area formed by a trench in the porous alumina layer, the trench extending up to the dielectric layer covering the support substrate.

The device has many advantages:
- the entire capacitance area could be used, in contrast with the capacitances of the prior art which have a "useless" portion,
- the porous material is advantageously used to create a via to connect the lower electrode,
- the section of the skin currents, and therefore the RF conduction for current markets with increasing frequencies (in the GigaHertz range),
- there is no need for etching or material deposition over large heights (several tens of µm) and the use of an ALD-type deposition allows obtaining a thin layer and maximising the capacitance,
- the separation area enables an insulation of the lower electrode of each device and/or the formation of cutting paths,
- the optimisation of the setup of the high-density capacitances, including the contact resumption areas.

Other features and advantages of the invention will appear from the following complementary description.

It goes without saying that this complementary description is given only to illustrate the object of the invention and should not be interpreted in any case as a limitation of this object.

BRIEF DESCRIPTION OF THE DRAWINGS

The present invention will be better understood upon reading the description of embodiments provided for purely indicative and non-limiting purposes with reference to the appended drawings wherein.

The different portions represented in the figures are not necessarily represented according to a uniform scale, to make the figures more readable.

It should be understood that the different possibilities (variants and embodiments) do not exclude each other and could be combined together.

Furthermore, in the description hereinafter, terms that depend on the orientation, such as "above", "on", "below", "under", etc. of a structure apply while considering that the structure is oriented as illustrated in the figures.

DETAILED DISCLOSURE OF PARTICULAR EMBODIMENTS

Although this is not limiting in any manner whatsoever, the invention finds particular applications in the field of high-density capacitances of more than 1 µF/mm$^2$. Advantageously, the capacitive device may be integrated into a structure comprising other components.

We will now describe in more details a method for manufacturing a capacitive device according to a particular embodiment of the invention with reference to FIGS. 2 to 11.

The principle of the method of the invention consists in generating "full-sheet" (also called full-plate") porous alumina layers.

Figure 9:
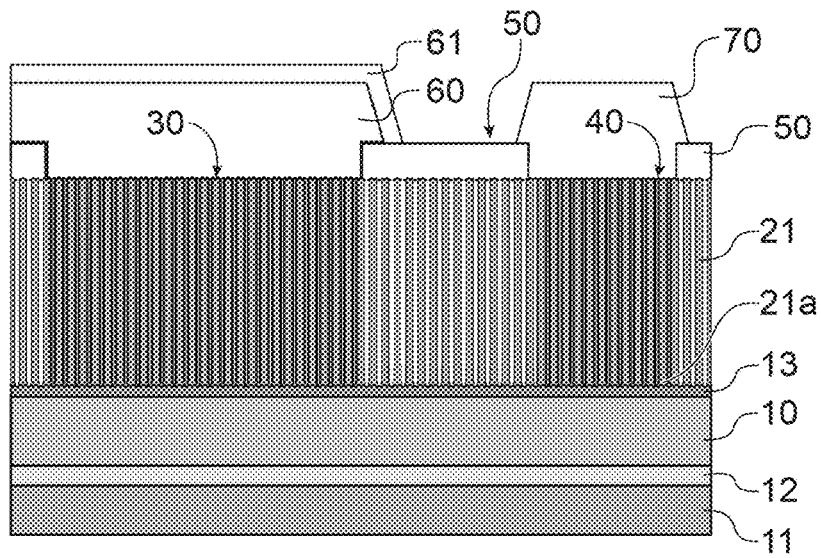

The method comprises the following steps:
manufacturing of a base substrate ("base wafer") through the following steps a), b) and c):
providing a metallic layer 10 (FIG. 2),
b) depositing a full-sheet aluminium layer 20 (FIG. 3),
c) structuring pores in the aluminium layer 20 by a full-sheet anodic etching process, subsequently to which a continuous porous alumina layer 21 is obtained comprising a first main face 21a and a second main face 21b, longitudinal pores extending from the first main face 21a to the second main face 21b of the porous alumina layer 21 (FIG. 4),
customisation of the base substrate through the following steps d), e), f) and g):
d) forming a capacitive area at a first area Z1 (also called capacitive area) of the porous alumina layer 21 (FIGS. 5 and 6),
e) forming an upper electrode 60 over the first area Z1 of the porous aluminium layer 21 (FIG. 7),
f) forming a contact resumption area at a second area Z2 (also called contact resumption area) of the porous alumina layer (FIG. 5),
g) forming a lower electrode 70 over the contact resumption area (FIG. 9).

The metallic layer 10 provided at step a) comprises a front face and an opposite rear face essentially parallel to the front face. Preferably, the metallic layer 10 is aluminium-based. The metallic layer 10 may comprise aluminium and/or copper. The metallic layer 10 may have a thickness comprised between 0.5 µm and 3 µm.

Advantageously, as represented in FIGS. 2 to 11, the metallic layer 10 rests on a support substrate 11, preferably covered by a dielectric layer 12, in particular an oxide layer. Thus, the dielectric layer 12 is interposed between the support substrate 11 and the metallic layer 10.

In particular, the support substrate 11 is a silicon substrate.

For example, the dielectric layer 12 is a silicon oxide layer.

The metallic layer 10 may be formed over the dielectric layer by a deposition or evaporation technique.

Still more advantageously, a so-called anodisation-barrier layer 13 covers the metallic layer 10. In this manner, the etching-barrier layer 13 protects the metallic layer 10 during the formation of the pores of the alumina (step c). For example, the barrier layer 13 is a tungsten layer. According to another variant, the barrier layer 13 comprises a stack. For example, the barrier layer 13 may comprise a full-sheet tungsten layer, for example having a 300 nm thickness.

For example, the etching barrier layer 13 may be deposited by Physical Vapour Deposition (or PVD) or by Atomic Layer Deposition (ALD).

Figure 1:
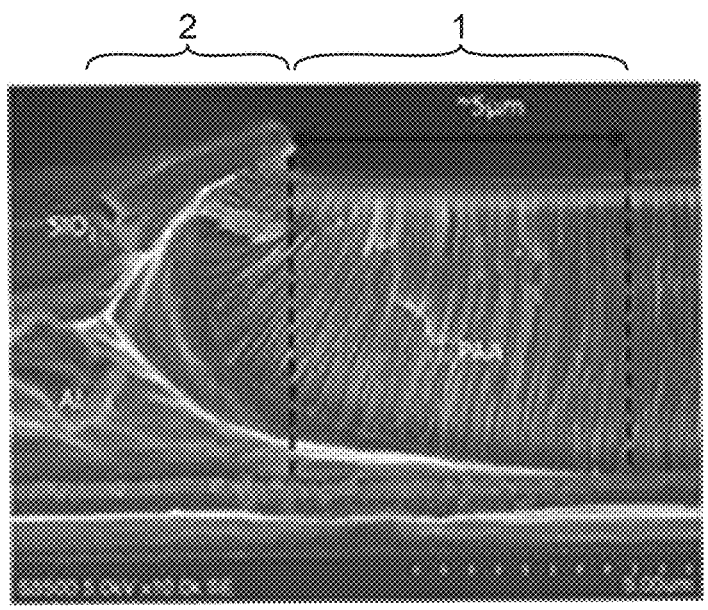
FIG. 1 described before, represents a transverse view of a porous alumina-based structure obtained with an anodisation hard mask, according to the prior art.
Figure 2:
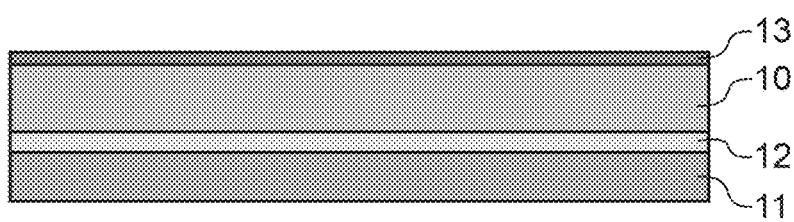
FIGS. 2, 3, 4, 5, 6, 7, 8, 9, 10 and 11 schematically represent different steps of a method for manufacturing a capacitive device according to a particular embodiment of the invention.
Figure 3:
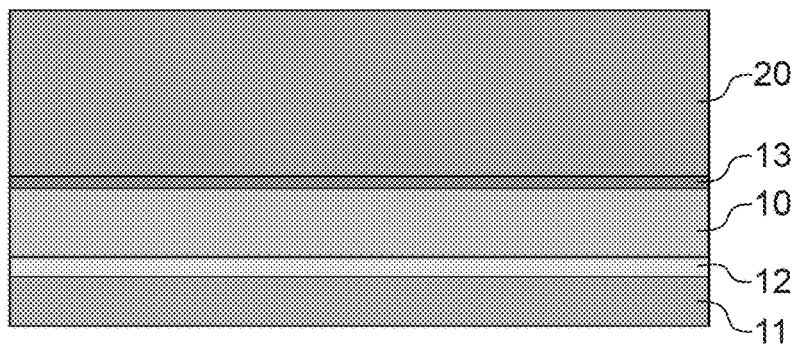

During step b), a full-sheet aluminium layer 20 is deposited (FIG. 3). The thickness of the final porous alumina layer 21 depends on the thickness of the initial aluminium layer 20.

Figure 4:
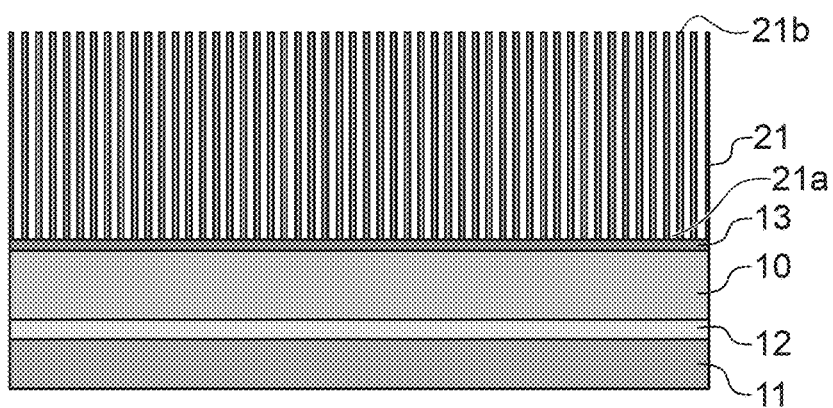
Figure 5:
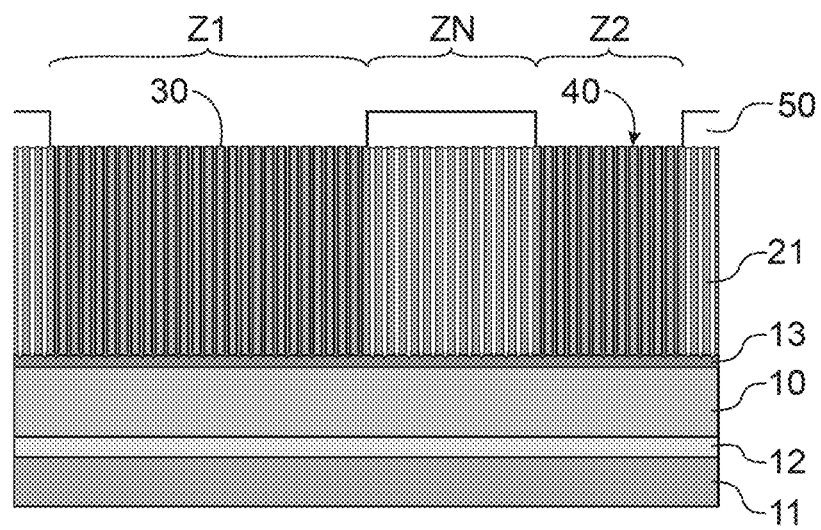
Figure 6:
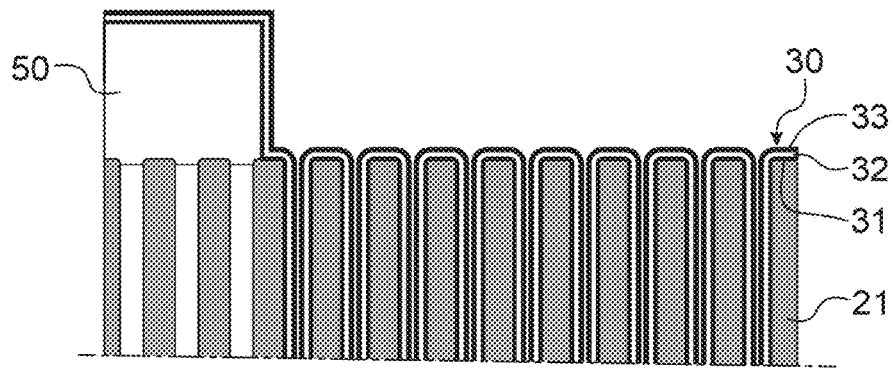

During step c), the aluminium layer 20 is anodised and etched so as to form the alumina layer 21 (FIG. 4).

Anodisation is an electrolytic process taking place in a wet medium. The principle is based on the application of an imposed potential difference between two conductive electrodes immersed in an electrolytic solution which may for example be oxalic or phosphoric acid. The application of a potential at the anode, induces an alumina growth at its surface, if the electrode is made of aluminium, and which, upon dissolution thereof in the acid bath, causes the apparition of nano-pores or holes in the surface of the metal.

Advantageously, thanks to the anodisation process, no photolithography step is used to create the pores. This step is carried out on a solid plate. No mask is needed.

Thus, this method allows optimising the method for manufacturing such a structure.

Etching is carried out until forming through pores over the metallic conductive layer 10 or over the barrier layer 13, where appropriate.

Step c) may be implemented in an acid bath, and in particular in a bath comprising one or several acid(s) such as oxalic acid or phosphoric acid, or other weak acids.

During this step c), the aluminium layer 20 is structured by oxidation and etching.

During the oxidation, aluminium oxide (or alumina or $Al_2O_3$) is formed.

Advantageously, the nano-pores have a diameter in the range of 50 nm with a step in the range of 150 nm. The diameter of the nano-pores may possibly be enlarged to a diameter in the range of 80 nm by wet etching in an acid bath, for example phosphoric acid.

In addition, the anodisation process used in the present invention enables the obtainment of nano-pores opening onto the metallic layer 10 or onto the etching barrier 13 where appropriate. This feature is obtained through a short wet over-etching of the anodised layer in a solution depending on the nature of the barrier layer. In general, buffered weak acid solutions will be selected. In other words, the nanopores may be considered as nano-cylinders one side of which opens onto the etching barrier layer.

The porous alumina layer 21 thus obtained comprises a first main face 21a and a second main face 21b. The pores of the porous alumina layer 21 extend between the first main face 21a and the second main face 21b. The pores open on each of these faces. Each pore forms a longitudinal channel perpendicular or substantially perpendicular to the main face 21a, 21b of the porous alumina layer 21.

The alumina layer 21 forms a porous matrix.

The alumina layer 21 has a thickness ranging from a few micrometres to a few tens of micrometres, for example from 10 μm to 15 μm.

Steps d) to g) consist in generating a capacitive area, a lower contact area and possibly a neutral area over the porous alumina layer.

The previously-described steps complete the manufacture of "full-sheet" substrates before a specific customisation to make one or several given component(s). This arrangement allows optimising the manufacture of these "standardised" substrates and reducing the associated costs.

The steps hereinafter describe the customisation of these substrates for specific devices.

According to a first variant, the capacitive area and/or the contact resumption area may be formed by depositing a capacitive stack in the pores of the matrix.

Figure 7:
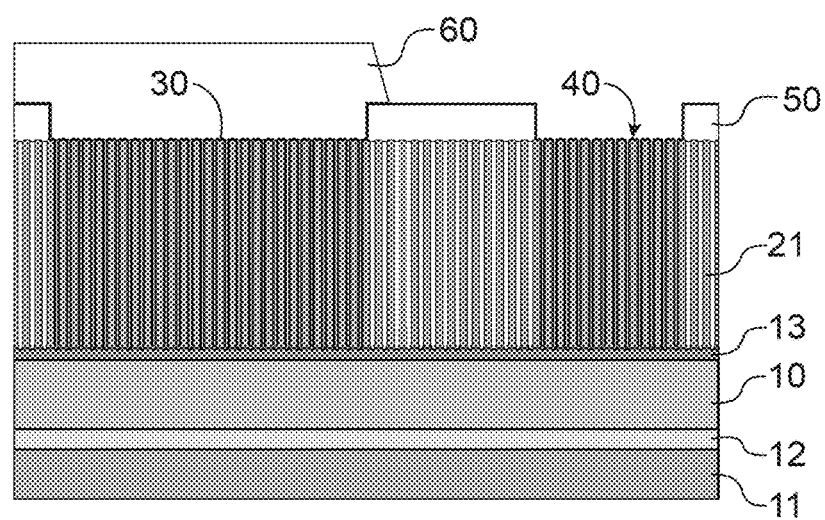
Figure 8:
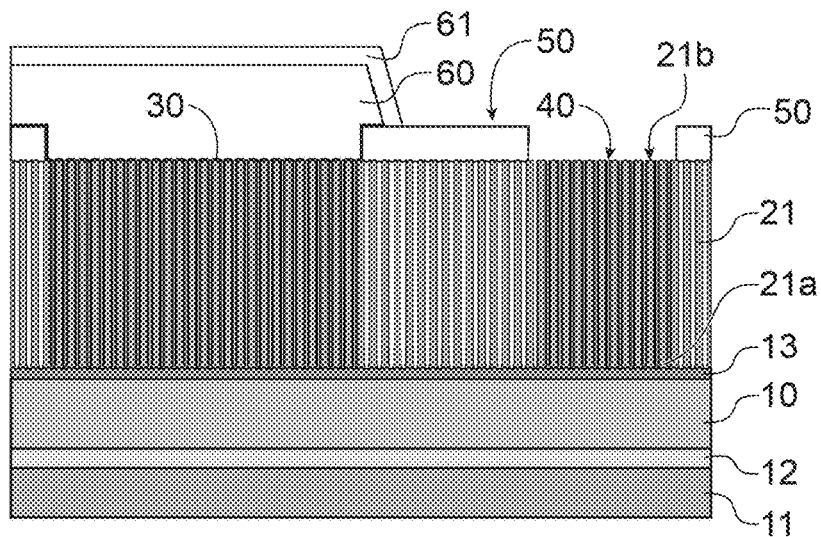

More particularly, an advantageous method for manufacturing a capacitive device according to this first variant comprises the following successive steps:

carrying out the previously-described steps a) to c)

ii) carrying out step d) and step f) preferably simultaneously by forming, advantageously, one single mask 50 over the porous alumina layer 21, the mask 50 having openings at a first area Z1 of the porous alumina layer 21 and at a second area Z2 of the porous alumina layer 21, then by simultaneously depositing a continuous capacitive stack over the first area Z1 of the porous alumina layer 21 and over the second area Z2 of the porous alumina layer 21, the capacitive stack 30 consistently covering the first area Z1 of the porous alumina layer 21 and the second area Z2 of the porous alumina layer 21, and consistently overlaying the pores of the first area Z1 of the porous alumina layer and of the second area Z2 of the porous alumina layer (FIGS. 5 and 6), the capacitive stack 30 comprising an upper conductive layer 33, an insulating layer 32 and a lower conductive layer 31, iii) carrying out step e) (i.e. form an upper electrode 60 over the first area)—FIG. 7, then etch the upper layer of the capacitive device (10 nm of TiN) through the hard mask of the conductive layer 60, iv) depositing a protective layer 61 over the upper electrode 60, v) etching the capacitive stack 30 at the second area Z2 of the porous alumina layer 21 so as to make the second face 21b of the porous alumina layer 21 at the second area Z2 accessible (FIG. 8);

vi) carrying out step g) (i.e. form a lower electrode 70 over the second area)—FIG. 9).

Advantageously, the mask 50 allows protecting the neutral area during the deposition of the capacitive stack. It may be manufactured according to the following substeps:

a substep of depositing a first dielectric layer, for example a silicon oxide layer, a substep of depositing a second dielectric layer, for example a silicon nitride layer, so as to form a dielectric stack, a photolithography/etching substep intended to keep the stack exclusively at the neutral area ZN.

For example, the first and second layers may have a thickness comprised between 10 nm and 1,000 nm.

The first dielectric layer may comprise TEOS and have a thickness comprised between 100 and 1,000 nm, for example equal to 500 nm.

The second dielectric layer, formed over the first dielectric layer, may have a thickness comprised between 100 nm and 500 nm.

During the photolithography/etching substep, a first pattern and a second pattern are defined in the second dielectric layer so that the latter forms a hard mask. Of course, the first pattern and the second pattern form through openings in the second dielectric layer. In particular, this first pattern and this second pattern allow delimiting the capacitive area and the contact resumption area respectively.

The formation of the patterns may involve photolithography, etching and photosensitive resin removal ("stripping") steps.

The etching, in particular a dry etching, intended to etch the first dielectric layer through the hard mask formed by the second dielectric layer, so as to form a first opening, matching with the first pattern, and a second opening matching with the second pattern.

Alternatively, if the opening of the pores has not been made completely during step c), it is possible to do it after the formation of the mask 50 and before the deposition of the capacitive stack.

The deposition of a Metal/Insulator/Metal (MIM) stack or of an Insulator/Metal (IM) stack is carried out while taking advantage of the deployed surface of the porous alumina.

The continuous capacitive stack 30 comprises an upper conductive layer 33 and an insulating layer 32 insulating the upper conductive layer 33 of the porous alumina layer 21.

The capacitive stack further comprises a lower conductive layer 31. Preferably, the capacitive stack 30 comprises two conductive layers 31, 33 separated by an insulating layer 32.

The simultaneous filling of the pores of the contact resumption area and of the capacitive area allows limiting the number of steps of the method. The deposition of the MIM or IM may be carried out through successive depositions by an atomic layer deposition (ALD) technique. This particularly consistent deposition technique allows depositing the stack over the second face of the porous matrix, but also in the pores of the porous matrix until contacting the metallic layer 10 or the etching barrier 13, where appropriate, accessible at the bottom of the pores.

To form the capacitive stack, the lower conductive layer 31, the insulating layer 32 then the upper conductive layer 33 are formed.

The first conductive layer 31 comes into contact with the metallic layer 10 or the etching barrier layer 13 located at the bottom of the nano-pores. This first conductive layer 31 may be made for example using an ALD-type deposition technique. For example, the used materials may be TiN, TaN, NiB, Ru or any other conductive material.

The insulating layer 32 of the capacitive stack 30, allows creating the capacitance between the upper conductive layer 33 and the lower conductive layer 31. The material used to make this dielectric layer must have the highest possible electric permittivity k in order to maximise the achieved capacitance value. Several type of materials, called "High-k" materials, preferably with an electric permittivity (k>6) may be used, such as, silicon nitride ($Si_3N_4$), alumina (aluminium oxide), hafnium oxide ($HfO_2$), or any other material having an electric permittivity k higher than or equal to the aforementioned materials. In addition, the used materials must be compatible with the technological processes used for the manufacture of the MIM-type capacitance structure.

The thickness of the insulating layer 32 is comprised for example between 5 nm and 80 nm (1 nm=$10^{-9}$ m), preferably it may have a thickness in the range of 10 nm.

The deposition processes allowing obtaining the insulating layer 32 may use different techniques known to a person skilled in the art. As example, the Atomic Layer Deposition (or ALD), or the Low Pressure Chemical Vapour Deposit (or LPCVD) may preferably be used.

Afterwards, the second conductive layer 33 of the capacitive stack 30 is deposited over the dielectric layer 32 thus allowing creating the MIM-type capacitance. The characteristics of this second conductive layer as well as the deposition methods may be identical to those used for making the first conductive layer.

The lower conductive layer 31 may be made of titanium nitride.

The upper conductive layer 33 may be made of titanium nitride.

The insulating layer 32 may be made of alumina.

Preferably, the capacitive stack 30 is a TiN/$Al_2O_3$/TiN three-layer.

The second dielectric layer of the mask 50 which is not protected during this deposition is also covered by the capacitive stack 30.

Conversely, in the neutral area ZN, the fraction protected by the mask 50 (i.e. by the two dielectric layers) is devoid of the capacitive stack.

This arrangement allows picking electrical contacts without exposing the pores of the matrix at steps of the method that might damage them.

The upper electrode 60 formed during step e) is obtained by depositing a metal layer. The upper electrode 60 has a thickness, for example in the range of 1 µm to 5 µm. For example, the materials used for the upper electrode may be aluminium (Al), copper (Cu), silver (Ag) combined, or not, with barrier materials such as titanium nitride (TiN), or tantalum nitride (TaN). For example, it may consist of an AlCu alloy.

The upper electrode 60 may feature a light overlap with the dielectric layers of the neutral area ZN. The formation of the upper electrode 60 is known to a person skilled in the art and therefore is not described in more details.

The device may comprise an upper electrode 60 over the first portion of the porous matrix (capacitive area) and arranged so as to electrically contact the upper conductive layer 33 of the capacitive stack 30. The upper electrode 60 may be covered by one or several insulating material layer (s). A contact resumption in the form of a metallic stud ("UBM" or "Upper Bump Metallurgy") may be formed throughout the insulating material layer(s). It may consist of a silicon oxide layer, a silicon nitride layer or a bilayer comprising the aforementioned two layers.

Step iv) consists in protecting the upper electrode 60 in preparation for step v) intended to expose the lower contact area Z2 to the external environment. For example, step g) consists in forming a dielectric layer 61 over the upper electrode.

Step v) is a step of etching, in particular RIE etching, through the $Al_2O_3$/SiN hard mask to etch the portion of the capacitive stack 30 that protrudes from the second main face 21b of the porous alumina layer 21 at the second area (area Z2 or ZC1).

The etching matches with the second pattern, and thus allows exposing the lower contact area ZC1 to the external environment.

Step v) is then followed by the formation of a lower electrode 70 (step vi) according to a protocol similar to that used for the formation of the upper electrode (step iii). The lower electrode 70 may be made of a material identical to or different from that of the upper electrode. For example, the lower electrode 70 is made of AlCu.

The device may comprise a lower electrode 70 over the second area Z2 of the porous matrix 21 (lower contact area) and arranged so as to electrically contact the second main face 21b of the porous matrix 21 at the lower contact area.

The lower electrode 70 may be covered by an insulating material layer 71. A contact resumption in the form of a metallic stud ("UBM") may be formed through this layer.

Figure 10:
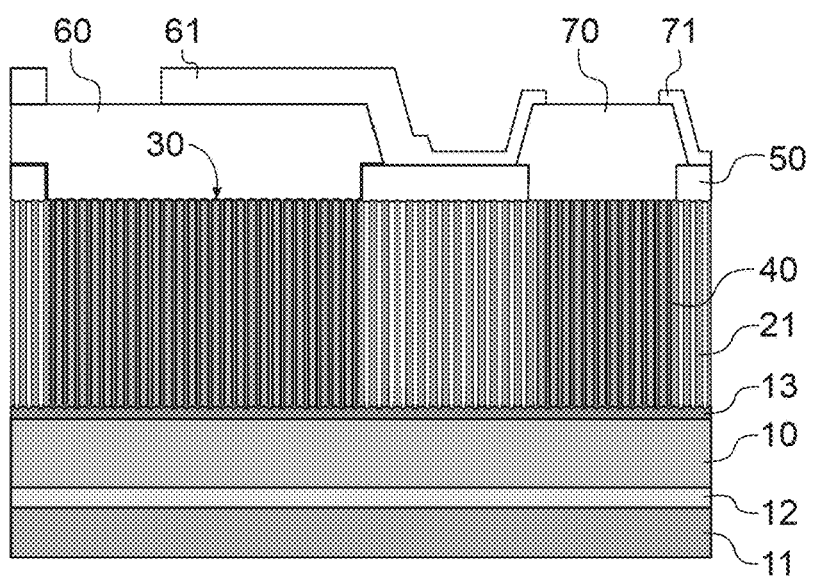

One or several contact stud(s) may be formed at the upper electrode and/or the lower electrode (FIG. 10).

Finally, the method for manufacturing the capacitive device may end with the formation of a passivation layer and the opening of the latter at two contact points so as to electrically access the upper electrode and the lower electrode.

In particular, the contact points are metallic studs ("UBM").

Figure 11:
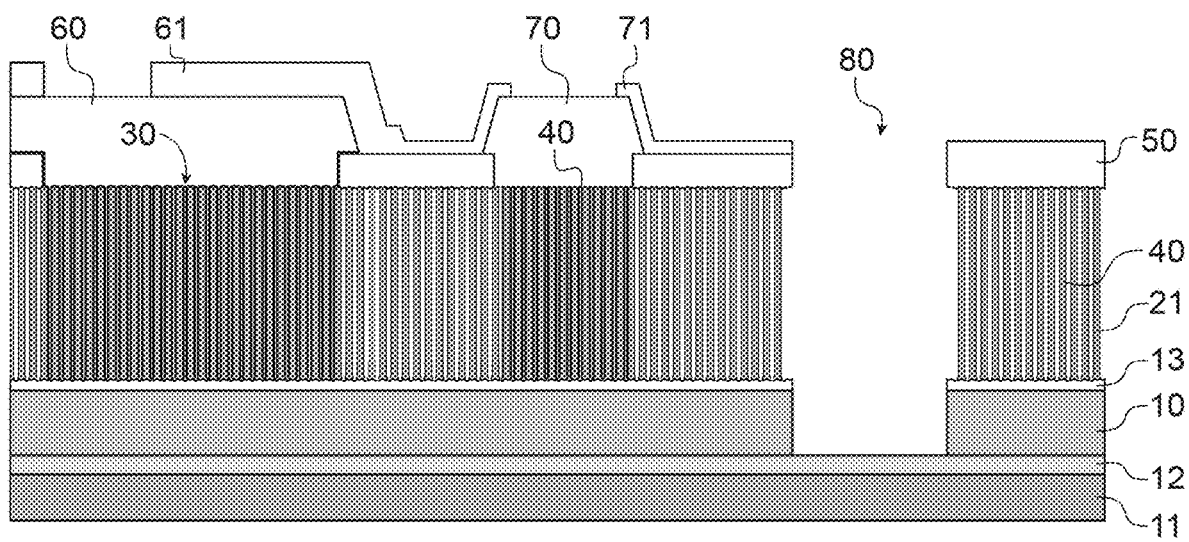

The method may also include a step during which a trench 80 is formed (FIG. 11). The trench 80 forms an area for separating the devices. For example, this trench 80 may serve to form cutting paths or to dissociate the lower electrode.

The trench 80 serving to insulate the lower electrode 70 from the adjacent device may be formed up to the metallic layer 10, or up to the dielectric layer 12 covering the support substrate 11 or up to the barrier layer 13 (which could serve as a stop layer).

For example, the trench 80 may be obtained by wet etching.

In particular, wet etching allows enlarging the pores laterally. The etching solution may be a $H_3PO_4$ (7%) solution at 45° C.

Etching of the porous alumina layer 21, of the barrier layer 13 and of the metallic layer 10 is carried out according to the thickness of the $Al_2O_3$ walls rather than the height (in the range of ten minutes with a $H_3PO_4$ solution at 7% at 45° C.).

The capacitive device thus obtained is remarkable in that it includes a full-sheet continuous porous alumina layer locally and consistently covered by a capacitive stack. The capacitive stack consistently overlays the pores of the porous matrix.

The arrangement of the capacitive stack allows defining a capacitive area (first area) and a lower contact area (second area) within the capacitive device. In particular, the capacitive area is an area at which the capacitive stack embeds the porous matrix and overlays the pores of the porous matrix, whereas the lower contact area is an area at which the capacitive stack leaves the second main face of the porous alumina layer uncovered while overlaying the pores of the porous matrix.

The device may also comprise a neutral area interposed between the capacitive area and the lower contact area.

The neutral area covers a third area of the porous alumina layer. Advantageously, there is no capacitive stack opposite the neutral area. In other words, at the neutral area, the pores of the matrix are not overlaid by the capacitive stack and the porous matrix is not covered by the capacitive stack.

The neutral area ZN may be covered with at least one encapsulation layer made of an insulating material. In particular, the encapsulation layer may comprise a silicon oxide layer or a silicon nitride layer. It is also possible to have a bilayer comprising a silicon nitride layer covering the silicon oxide layer.

Alternatively, the contact resumption area may be formed by partially or totally filling the pores of the porous matrix, at the second area, with an electrically-conductive element, for example copper, nickel, tungsten. This electrically-conductive element may be deposited by electrochemical deposition (ECD) or by atomic layer deposition (ALD).

Alternatively, the capacitive area Z1 and/or the contact resumption area Z2 may be formed by forming nanowires in the pores of the matrix, by removing the matrix and then by depositing a capacitive stack in the pores of the matrix.

More particularly, an advantageous method for manufacturing a capacitive device according to this variant comprises the following successive steps:

carrying out the previously-described steps a) to c)

ii') carrying out step d) and step f) preferably simultaneously by:

forming a mask over the porous alumina layer 21, the mask having openings at a first area Z1 of the porous alumina layer 21 and at a second area Z2 of the porous alumina layer 21, forming metallic nanowires or carbon nanotubes in the pores of the matrix at the first area Z1 and the second area Z2, removing the porous alumina matrix 21, depositing a continuous capacitive stack over the metallic nanowires or the carbon nanotubes at the first porous area and over the second area, the capacitive stack consistently covering the metallic nanowires or the carbon nanotubes, the capacitive stack comprising an upper conductive layer 33, an insulating layer 32 and possibly a lower conductive layer 31, iii) carrying out step e) (i.e. form an upper electrode 60 over the first area Z1), iv) depositing a protective layer 61 over the upper electrode 60, v) etching the capacitive stack at the second area Z2 so as to make the end of the nanotubes or of the nanowires at the second area Z2 accessible, vi) carrying out step g) (i.e. form a lower electrode 70 over the second area Z2).

The formation of the metallic nanowires or of the carbon nanotubes may be carried out through a growth step implementing standard techniques. In particular, the carbon nanotube bundles may be formed by DC-PECVD or DCVD at a temperature in the range of 400° C. with different precursors and catalysts.

The nanotubes or the nanowires may have an average length comprised between 2 µm and 40 µm, advantageously comprised between 2 µm and 12 µm.

For example, the nanowires are tungsten, copper or nickel nanowires.

The nanowires form a network of nanowires.

The nanotubes form a network of nanotubes.

The nanowires or the nanotubes, and more particularly the carbon nanotubes, which have a significant surface/volume ratio, are prime candidates for making these structures with a high shape factor.

According to this variant, it is possible to have an insulator/metal (IM) or metal/insulator/metal (MIM) type capacitive stack because the metallic nanowires and the carbon nanotubes are electrically conductive.

Steps iii), iv) and vi) may be made like for the first variant.

The layers of the capacitive stack may be made like in the first variant.

Illustrative and Non-Limiting Examples of an Embodiment:

In this example, we will describe a method for manufacturing a capacitive device. The natures and thicknesses of the conductive or insulating layers are given for indication.

Manufacture of the Base Substrate:
  Deposition of a 500 nm full-sheet $SiO_2$ ($SiH_4$) layer 12 over a silicon substrate 11,
  2) Deposition of a conductive metallic layer 10, 2 μm of full-sheet AlCu
  3) Deposition of a 300 nm full-sheet W barrier layer 13
  4) Deposition of 10 to 15 μm of a full-sheet Al layer 20
  5) Anodisation of about 1 μm of Al (it is possible to tune the anodisation voltage, the temperature of the bath and the electrolyte to define "the arrangement" of the formed alumina, in particular the spacing ("pitch")),
  6) Etching of the formed alumina to obtain an organised preformed Al surface
  7) Total anodisation of the Al until forming pores,
  8) Possibly wet enlargement of the pores
  9) Opening of the pores up to the tungsten layer 13.

Upon completion of these steps, a porous alumina layer 21 whose longitudinal pores extend from a first face 21a to a second main face 21b is obtained.

Manufacture of the Capacitive Device from the Base Substrate:
  10) Deposition of 200 nm of $SiO_2$ (TEOS for example)
  11) Structuring of the $SiO_2$ layer by photolithography and then etching with stoppage at the alumina layer, then removal of the resin ("stripping"), so as to form a mask 50 having openings at a first area Z1 and at a second area Z2,
  12) Full-sheet deposition by ALD of the "MIM" type capacitive stack 30, formed by a lower conductive layer 31 (for example 10 nm TiN), an insulating layer 32 (20 nm of $Al_2O_3$ for example) and an upper conductive layer 33 (10 nm of TiN for example)
  13) Deposition of about 1 μm of Al or AlCu
  14) Structuring of the Al or AlCu layer to form an upper electrode 60: lithography, etching with stoppage at the upper conductive layer 33 made of TiN of the (MIM) capacitive stack 30
  15) Etching of the upper conductive layer made of TiN of the capacitive stack 30 at the second area Z2 with the Al hard mask or resin mask and removal of the resin ("stripping")
  16) 500 nm passivation deposition of a SiN layer 61
  17) Structuring of the SiN layer by lithography, SiN etching with stoppage at the insulating layer 32 made of $Al_2O_3$ of the capacitive stack 30 and removal of the resin ("stripping")
  18) RIE etching through the SiN hard mask of the $Al_2O_3$ (of the MIM) with over-etching of the lower conductive layer 31 of the (MIM) capacitive stack 30 with stoppage at $SiO_2$, porous alumina or NTC or metallic nanowires,
  19) Deposition of a 1 μm of an Al or AlCu layer
  20) Structuring of the Al or AlCu layer—lithography, Al etching with stoppage at $SiO_2$ and SiN, removal of the resin ("stripping") to form a lower electrode 70,
  21) Opening of the SiN passivation layer over the AlCu of the upper electrode 60,
  22) possibly, depending on the shape ("design") of the contact studs: deposition of a second SiN passivation layer and opening of this passivation layer onto the AlCu of the two electrodes 60, 70.

In the case of an incompatibility between the lithography step and the pores of the matrix for example due to an infiltration upon the removal of the resin (or which might be due to a poor compatibility with the carbon nanotubes or the nanowires where appropriate), steps 11 and 12 may be replaced by the following steps: deposition of a SiN layer to form a SiN hard mask, then RIE etching of $SiO_2$ through the SiN hard mask; the hard mask avoids the porous matrix being in contact with a liquid solution that might pollute the structure.

In order to avoid the use of a hard mask, step 16) may be replaced by the following steps:
  lithography to achieve the contact of the lower electrode (opening in the lower contact resumption areas) with etching of the dielectric layer and the lower conductive layer of the MIM with over-etching and removal of the resin ("stripping"),
  SiN or $SiO_2$ deposition (passivation)+litho+etching over the upper 60 and lower 70 electrodes, then removal of the resin ("stripping"),
  metal deposition, lithography, etching of the metal with stoppage at the (SiN or $SiO_2$) passivation.

Alternatively, it is possible to dissociate the formation of the capacitive area and of the contact resumption area.

For example, it is possible to mask the capacitive area and make a metallic deposition by ALD or an ECD growth (for example Ni or W or Cu) in the contact resumption area. This allows limiting the number of ALD depositions.

The method may further comprise the insulation of the lower electrode from the different components and incidentally the generation of cutting paths or trenches 80 to discretise the components. The method then further comprises the following steps:
  wet etching the porous alumina layer 21 for a "pore lateral enlargement",
  etching the tungsten stop layer 13,
  etching the AlCu conductive metallic layer 10.

What is claimed is:

1. A method for manufacturing a capacitive device comprising the following steps:
  a) providing a metallic layer,
  b) depositing a full-sheet aluminium layer,
  c) structuring pores in the aluminium layer by a full-sheet anodic etching process, subsequently to which a continuous porous alumina layer is obtained comprising a first main face and a second main face, longitudinal pores extending from the first main face to the second main face of the alumina layer,
  d) forming a mask over said continuous porous alumina layer, said mask having an opening making a first area of the porous alumina layer accessible, said mask covering an intermediate porous area of the alumina layer between said first area and a second area of the porous alumina layer, then forming a capacitive area by depositing a capacitive stack at the first area of the porous alumina layer while said intermediate porous area of the porous alumina layer remains covered by said mask,
  e) forming an upper electrode over the capacitive area,
  f) forming a contact resumption at the second area of the porous alumina layer,
  g) forming a lower electrode over the contact resumption.

2. The method according to claim 1, wherein step d) comprises the following substeps:
  d1) over the porous alumina layer, forming the mask having said opening making the first area of the porous alumina layer accessible,
  d2) the step of forming the capacitive stack over the first area of the porous alumina layer being conducted by conformal deposition of the capacitive stack so that the capacitive stack is conformally covering the porous alumina layer and conformally overlaying the pores of the porous alumina layer of the first area, the capacitive stack comprising an upper conductive layer, an insulating layer and a lower conductive layer.

3. The method according to claim 1, wherein step f) comprises the following substeps:
f1) over the porous alumina layer, forming a mask having an opening making the second area of the porous alumina layer accessible,
f2) depositing a second continuous capacitive stack over the second area of the porous alumina layer, the second capacitive stack conformally covering the porous alumina layer and conformally overlaying the pores of the porous alumina layer, at the second area,
f3) the step of forming the contact resumption further comprising etching the second capacitive stack at the second area of the porous alumina layer so as to make the second face of the porous alumina layer at the second area accessible,
the second capacitive stack comprising said upper conductive layer, an insulating layer and a lower conductive layer.

4. The method according to claim 2, wherein the capacitive stack and the second capacitive stack are identical and deposited simultaneously by ALD.

5. The method according to claim 1, wherein step d) comprises the following substeps:
d1') over the porous alumina layer, forming the mask having said opening making the first area of the porous alumina layer accessible,
d2') forming metallic nanowires or carbon nanotubes by electrochemistry in the pores of the alumina layer at the first area,
d3') removing the porous alumina layer at the first area,
d4') depositing a continuous capacitive stack over the metallic nanowires or over the carbon nanotubes, at the first area, the capacitive stack conformally covering the metallic nanowires or the carbon nanotubes,
the capacitive stack being formed of the upper conductive layer and an insulating layer or being formed of the upper conductive layer, an insulating layer, and a lower conductive layer.

6. The method according to claim 1, wherein step f) comprises the following substeps:
f1') over the porous alumina layer, forming a mask having an opening making the second area of the porous alumina layer accessible,
f2') forming metallic nanowires or carbon nanotubes by electrochemistry in the pores of the porous alumina layer at the second area,
f3') removing the porous alumina layer at the second area,
f4') depositing a continuous capacitive stack over the metallic nanowires or over the carbon nanotubes, at the second area, the capacitive stack conformally covering the metallic nanowires or the carbon nanotubes,
the capacitive stack being formed of the upper conductive layer and an insulating layer or being formed of the upper conductive layer, an insulating layer and a lower conductive layer.

7. The method according to claim 1, wherein step f) comprises the following substeps:
over the porous alumina layer, forming a mask having an opening making the second area of the porous alumina layer accessible, the step f) of forming the contact resumption comprising
totally or partially filling the pores of the porous alumina layer at the second area, with an electrically-conductive element by electrochemical deposition or by atomic layer deposition.

8. The method according to claim 1, wherein the metallic layer rests on a support substrate covered by a dielectric layer and wherein the method includes a step during which a trench is formed in the porous alumina layer, the trench extending up to the dielectric layer covering the support substrate.

9. The method according to claim 1, wherein an electrically conducting barrier layer is disposed between the metallic layer and the aluminium layer.

10. The method according to claim 9, wherein the barrier layer is made of tungsten.

11. The method according to claim 1, wherein the porous alumina layer has a thickness ranging from 10 to 15 µm.

12. The method according to claim 1, wherein the mask formed over said continuous porous alumina layer has a second opening making the second area of the porous alumina layer accessible, the forming of the contact resumption at the second area of the porous alumina layer, being conducted through said second opening of said mask.

13. A method for manufacturing a capacitive device comprising the following steps:
a) providing a metallic layer, the metallic layer resting on a support substrate covered by a dielectric layer,
b) depositing a full-sheet aluminium layer,
c) structuring pores in the aluminium layer by a full-sheet anodic etching process, subsequently to which a continuous porous alumina layer is obtained comprising a first main face and a second main face, longitudinal pores extending from the first main face to the second main face of the alumina layer,
d) forming a capacitive area at a first area of the porous alumina layer,
e) forming an upper electrode over the capacitive area,
f) forming a contact resumption at a second area of the porous alumina layer,
g) forming a lower electrode over the contact resumption, the method further including a step during which a trench is formed, the trench extending up to the dielectric layer covering the support substrate.

14. A method for manufacturing a capacitive device comprising the following steps:
providing a metallic layer,
depositing a full-sheet aluminium layer on said metallic layer,
structuring pores in the aluminium layer by a full-sheet anodic etching process without using a mask subsequently to which a continuous porous alumina layer is obtained, porous said porous alumina layer comprising a first main face and a second main face, said porous alumina layer being provided with longitudinal pores extending from the first main face to the second main face,
forming a mask over said continuous porous alumina layer, said mask having an opening to provide access to a first region of the porous alumina layer, said mask being provided with a portion covering an intermediate porous region of the continuous porous alumina layer, said intermediate porous region being localised between said first region and a second region of the porous alumina layer,
forming a capacitive structure in said first region by:
conformally depositing a capacitive stack in the pores of said first region of the porous alumina layer or by:
filling the pores of said first region of the porous alumina layer with metallic nanowires or carbon nanotubes then removing the porous alumina layer then depositing a capacitive stack over the metallic nanowires or over the carbon nanotubes, the capacitive stack conformally covering the metallic nanowires or the carbon nanotubes, the method further comprising:

forming an upper electrode for said capacitive structure on said first region, said upper electrode being in contact with the upper conductive layer of said capacitive stack, forming a contact resumption in the second region of the porous alumina layer or at the location of said second region, forming a lower electrode over the contact resumption.

\* \* \* \* \*